United States Patent [19]
Baru et al.

[11] Patent Number: 5,878,409
[45] Date of Patent: Mar. 2, 1999

[54] METHOD AND APPARATUS FOR IMPLEMENTING PARTIAL DECLUSTERING IN A PARALLEL DATABASE SYSTEM

[75] Inventors: Chaitanya Baru, San Jose, Calif.; Gilles Fecteau, Toronto, Canada; Jo-Anne Kirton, Richmond Hill, Canada; Lubor J. Kollar; Fred Koo, both of North York, Canada

[73] Assignee: International Business Machines Corporation, Armonk, N.Y.

[21] Appl. No.: 630,264

[22] Filed: Apr. 10, 1996

[30] Foreign Application Priority Data

Jun. 1, 1995 [CA] Canada .................................. 2150745

[51] Int. Cl.$^6$ .................................................. G06F 17/30
[52] U.S. Cl. ................................ 707/2; 707/10; 707/205; 711/153
[58] Field of Search .................................. 707/10, 2, 100, 707/101, 205; 711/170–173, 206, 202, 209, 153

[56] References Cited

U.S. PATENT DOCUMENTS

| | | | |
|---|---|---|---|
| 5,448,727 | 9/1995 | Annevelink | 707/101 |
| 5,515,531 | 5/1996 | Fujiwara et al. | 707/3 |
| 5,530,658 | 6/1996 | Hafner et al. | . |
| 5,546,575 | 8/1996 | Potter et al. | 707/101 |
| 5,551,027 | 8/1996 | Choy et al. | 707/201 |
| 5,689,678 | 11/1997 | Stallmo et al. | . |
| 5,710,938 | 1/1998 | Dahl et al. | . |

OTHER PUBLICATIONS

Catania, V. et al., "Design and Performance Analysis of a Disk Array System," IEEE Transactions on Computers, v44, n 10, Oct. 1995, pp. 1236–1247.

Catania, V. et al., "Performance Evaluation of a Partial Dynamic Declustering Disk Array System," Proc. of the 3rd IEEE Internat'l Symposium on High Performance Distributed Computing, ACM SIGCOMM, 2–5 Aug. 1994, pp. 244–252.

Miller Stewart, "Parallel Processing with DB2PE,"DBMS, v9, n3, Mar. 1996, pp. 75(4).

S. Padmanabhan, "Data Placement in Shared–Nothing Parallel Database Systems", Ph.D. Thesis, EECS Department, University of Michigan, Ann Arbor, 1992, (pp. 1–175).

E. Ozkarahan and M. Ouksel, "Dynamic and Order Preserving Data Partitioning for Database Machines," Proceedoings of the 1985 VLDB International Confernece, 1985, (pp. 358–368).

G. Copeland, et al., "Data Placement in BUBBA", Proceedings of 1988 ACM SIGMOD Conference, Chicago, Jun. 1988, (pp. 99–108).

S. Ghandeharizadeh and D.J. Dewitt, "MAGIC: A Multiattribute Declustering Mechnanism for Multiprocessor Database Machines", IEEE Transactions on Parallel and Distributed Systems, vol. 5, No. 5, May 1994, (pp. 509–524).

*Primary Examiner*—Maria N. Von Buhr
*Attorney, Agent, or Firm*—Merchant, Gould, Smith, Edell, Welter, & Schmidt

[57] ABSTRACT

A method and apparatus for distributing data of a table across a parallel data base system having a plurality of interlinked database nodes. The table is partitioned in accordance with a predetermined partitioning arrangement and data of the table is distributed across a subset of the nodes in accordance with the partitioning arrangement. The partitioning arrangement can comprise horizontal or vertical partitioning. The partitioning arrangement can comprise a partitioning map defining the relationship of partitions of the table to said subset of nodes.

33 Claims, 6 Drawing Sheets

METHOD AND APPARATUS FOR IMPLEMENTING PARTIAL DECLUSTERING IN A PARALLEL DATABASE SYSTEM

FIELD OF THE INVENTION

This invention relates generally to the storing of data in parallel database systems and more particularly to a method of distributing data in a table across a subset of the nodes of the parallel database system. The invention is particularly useful in relational database systems.

BACKGROUND OF THE INVENTION

Employing static partitioning for data in a shared nothing parallel data processing system, one method of exploiting parallel processing is to partition database tables across the nodes (typically containing one or more processors and associated storage) of the system. This is referred to as "declustering" of the table. If a database table is partitioned across only a subset of the nodes of the system then that table is said to be "partially declustered". While the concepts of declustering and partial declustering are known, no method previously existed for constructing or supporting partially declustered tables in a statically partitioned parallel database system.

Without partial declustering, the information in each table of the parallel database system would need to be spread across the entire parallel database system which could result in significant inefficiency from excess communication overhead as a result of small tables being distributed across a large number of nodes in the parallel database system. This is referred to as "full declustering" and in addition to the above inefficiency does not permit multiple databases to be divided up into groups of nodes that are subsets of the parallel system. It would be desirable in some cases to divide up the parallel database system into a number of groups of nodes, each group being assigned to a particular database with the tables of that particular database being declustered across the particular group of nodes.

Without the ability to perform partial declustering in a parallel database system the user may not have the ability to control the performance and manageability of the parallel database system.

SUMMARY OF THE INVENTION

The invention herein overcomes the problems of the prior art in providing a method of partial declustering for a statically partitioned parallel database system.

The invention provides for and in a statically partitioned parallel database system which has a plurality of interlinked database node in which each of the nodes is associated with storage means and processor resources, a method of distributing data of a table across a subset of the nodes using partitioning of the table. Horizontal or vertical partitioning can be used.

More particularly, optimization of the parallel database system under the invention can be achieved by selecting the number of nodes for a subset based on the size of the table to be declustered, the capacity of storage resources at each node, the maximum number of partitions of the table, and the nature of operations to be performed on said table, such as performing a sequential scan, an index based scan or relational join operations.

Advantageously the method of the invention includes the use of a partitioning map which is generated to define the mapping of partitions of the table to the nodes in a subset.

The method of the invention may include the distribution of data to the nodes in accordance with a partitioning key value, partitioning method, and information stored in the partitioning map. The partitioning key comprises a set of user defined fields for the table. The partitioning key value is the value of a selected set of fields for a particular row of the table.

Advantageously the partitioning method may include hash partitioning, range partitioning, or round-robin partitioning, which is applied to the key value to obtain an index value to the partitioning map which defines the location in the partitioning map which provides the node number where the row is to be stored.

A useful embodiment of the invention includes one in which each of the nodes is associated with its own storage resources and its own processor or its own set of processors, ie. a shared nothing system.

Further aspects of the invention provide a parallel data base system comprising a plurality of interlinked database nodes, each of the nodes having associated storage and processor resources.

The database system includes data distribution apparatus for distributing data of a table across the nodes, in which the apparatus includes a partitioner for partitioning the table in accordance with a predetermined partitioning arrangement and distributor for distributing data of said table across a subset of said nodes in accordance with said partitioning arrangement.

The partitioning arrangement advantageously may comprise a partitioning map defining the relationship of partitions of the table to the subset of nodes.

Preferably, the partitioning map defines the mapping of horizontal partitions of the table to the subset of nodes.

Yet another aspect of the invention provides an article of manufacture (a computer program product) comprising a computer useable medium having computer readable program code routine embodied therein for causing a computer system to distribute data of a table across a subset of nodes of a parallel database system. A computer readable program code routine in the article of manufacture comprises a computer readable program code partitioning routine for causing a computer system to partition the table in accordance with a predetermined partitioning arrangement, and computer readable program code for causing a computer system to distribute data of the table across a subset of the nodes in accordance with the partitioning arrangement.

The partitioning arrangement preferably comprises a computer readable program code partitioning arrangement routine for causing a computer system to horizontally or vertically partition said table.

The partitioning arrangement is preferably a program routine for causing a computer to establish a partitioning map defining the relationship of partitions of the table to the subset of nodes.

DESCRIPTION OF THE PREFERRED EMBODIMENT

The problem of determining the best storage strategy for the tables in a given parallel database system is known to be a difficult problem (see S. Padmanabhan, "Data Placement in Shared-Nothing Parallel Database Systems", PhD Thesis, EECS Department, University of Michigan, Ann Arbor, 1992) and several approaches have been taken to solve this problem (see E. Ozkarahan and M. Ouksel, "Dynamic and Order Preserving Data Partitioning for Database Machines", Proceedings of 1985 VLDB International Conference, 1985; G. Copeland et al, "Data Placement in BUBBA", Proceedings of 1988 ACM SIGMOD Conference, Chicago, pp. 99–108, June 1988; S. Ghandeharizadeh and D. J. DeWitt, "MAGIC: A Multiattribute Declustering Mechanism for Multiprocessor Database Machines", IEEE Transactions on Parallel and Distributed Systems, Volume 5, May 1994).

Three important aspects of data placement include declustering, assignment and partitioning. Declustering refers to the technique of distributing the rows of a single table across multiple nodes. If the rows are stored across all the nodes of the parallel database system, then the table is said to be "fully declustered". If the rows are distributed across a subset of nodes, then the table is said to be "partially declustered". The number of nodes across which a table is declustered is referred to as the "degree of declustering" of the table. The term "table partition" refers to the set of rows of a given table that are all stored at one node of the shared-nothing system (therefore, the number of table partitions equals the degree of clustering).

After choosing the degree of declustering, it is important to solve the assignment problem, which is the problem of determining the particular set of nodes on which the table partitions are to be stored. The following issues arise during assignment. Given any two database tables, their assignment may be nonoverlapped, i.e., the two tables do not share any common nodes. Conversely, their assignment may be overlapped, in which case the two tables share at least one node. If both tables share exactly the same set of nodes, then the tables are said to be fully overlapped. Finally, the problem of partitioning refers to the problem of choosing a technique to assign each row of a table to a table partition. Common techniques are, round-robin, hash, and range partitioning. In the last two, a set of columns (attributes) of the table are defined as the partitioning keys and their values in each row are used for hash or range partitioning.

Figure 5:
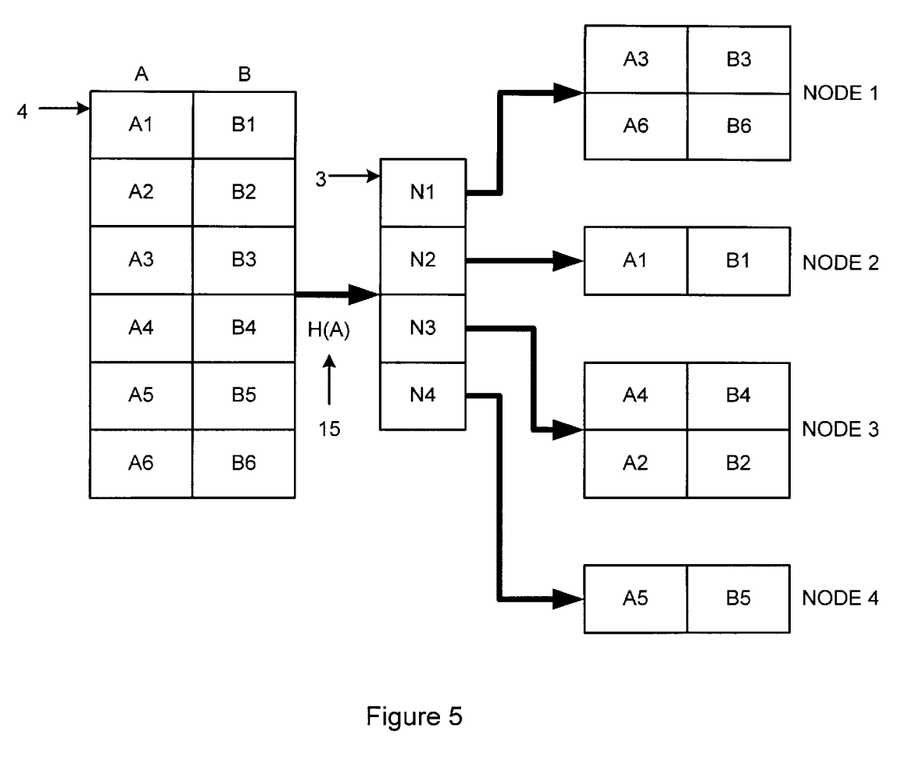
FIG. 5 is an illustration of partitioning keys and a partitioning map.

While the invention herein is useful in a shared nothing parallel data processing system it is also useful in systems that share some or all resources. In a shared-nothing parallel database system implementing a relational database system, a single database can be stored across several computers (which includes a processor and storage) or nodes that do not share memory or disk storage. A technique called "horizontal partitioning" is used to spread the rows of each table in the database across multiple nodes. The advantage of horizontal partitioning is that one can exploit parallel input/output capability to improve the speed at which data is read from storage units associated with the nodes. The technique used to determine in which node a given row of a table is stored is called the "partitioning strategy". A number of suitable partitioning strategies exist, eg. key range, round robin, and hash partitioning. For example, in a hash partitioning strategy, a hash function is applied to values in a predetermined set of columns, namely the partitioning key columns, as illustrated in FIG. 5, and the resultant value is used as the node number at which the corresponding row is stored.

With horizontal partitioning, there is typically an optimal number of nodes beyond which it is not beneficial to partition data, due to the overheads involved in storing, retrieving and collecting data that is spread across many nodes. Typically, smaller tables should be partitioned across fewer nodes, larger tables should be partitioned against more nodes. Thus, a database user should be allowed to exercise control on the number of nodes on which a table is stored. Also, it is possible that an organization that owns a large parallel computer may administer it in such a way that different databases reside on different sets of nodes. Thus, a shared-nothing parallel database system advantageously should preferably provide mechanisms by which users can control the number of nodes, and the specific nodes, on which the database tables are stored. This is achieved by the present invention and is illustrated in conjunction with the following particular embodiment.

While embodiments of the invention are discussed in terms of horizontal partitioning, it will be realized by those skilled in the art referring to this specification, that vertical partitioning can be utilized to spread the columns of a table, or tables across multiple nodes and that the operations and description pertaining to rows can be applied to columns when using vertical partitioning.

BRIEF DESCRIPTION OF THE DRAWINGS

The features of the invention will become more apparent by reference to the following description taken in conjunction with the accompanying drawings, in which.

DETAILED DESCRIPTION OF THE INVENTION

The present invention provides a method and apparatus for implementing partial declustering so that users can optimize the performance of database systems. In the particular embodiment discussed below, partial declustering is implemented using horizontal partitioning in the context of hash partitioning of database tables.

A parallel database system and the steps for creating a computer program to implement the invention are described herein.

The specific implementation herein makes use of nodegroups in order to support partial declustering of hash partition database tables. Nodegroups are subsets each of which is uniquely identified, eg. by a user provided name of the nodes of a parallel database system. Nodegroups are defined within each database, in this example, by a user, although the processing system can provide default nodegroup definitions.

Figure 2:
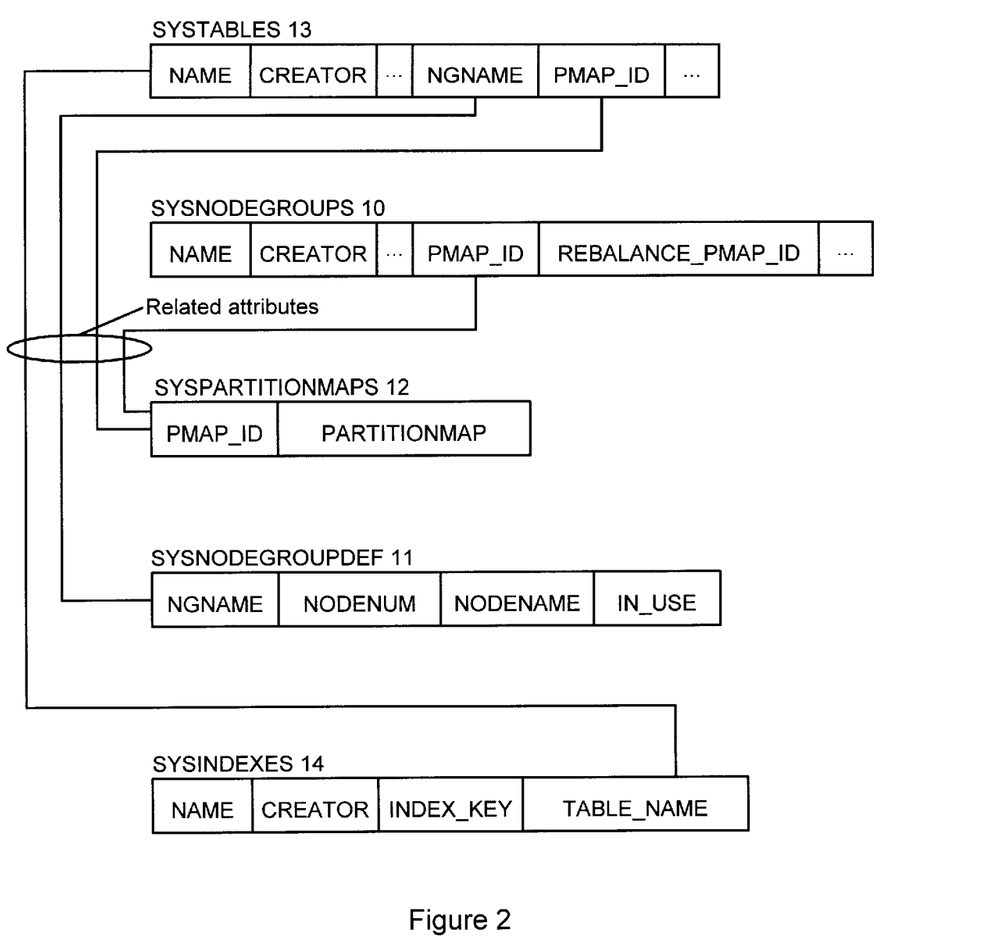
FIG. 2 is an illustration of the tables contained in the catalogue of the parallel database system, representing information that the system keeps in order to implement partial declustering for user tables.

At the time of their creation, tables are created within existing nodegroups. As a result, the data in the table is partitioned only across the set of nodes defined in the corresponding nodegroup. In order to facilitate the invention, data definition instructions have been created to allow users to create, drop and alter nodegroup definitions. Relational databases typically use SQL for operation so this embodiment will be discussed with the premise that SQL is used. In the specific embodiment support for nodegroups, new SQL Data Definition Language (DDL) statements have been created. These are discussed below. Referring to FIG. 2, new catalogue tables have also been introduced to store information related to nodegroups in normalized form. These will be discussed in greater detail subsequently in this description.

Data Structures

Figure 1:
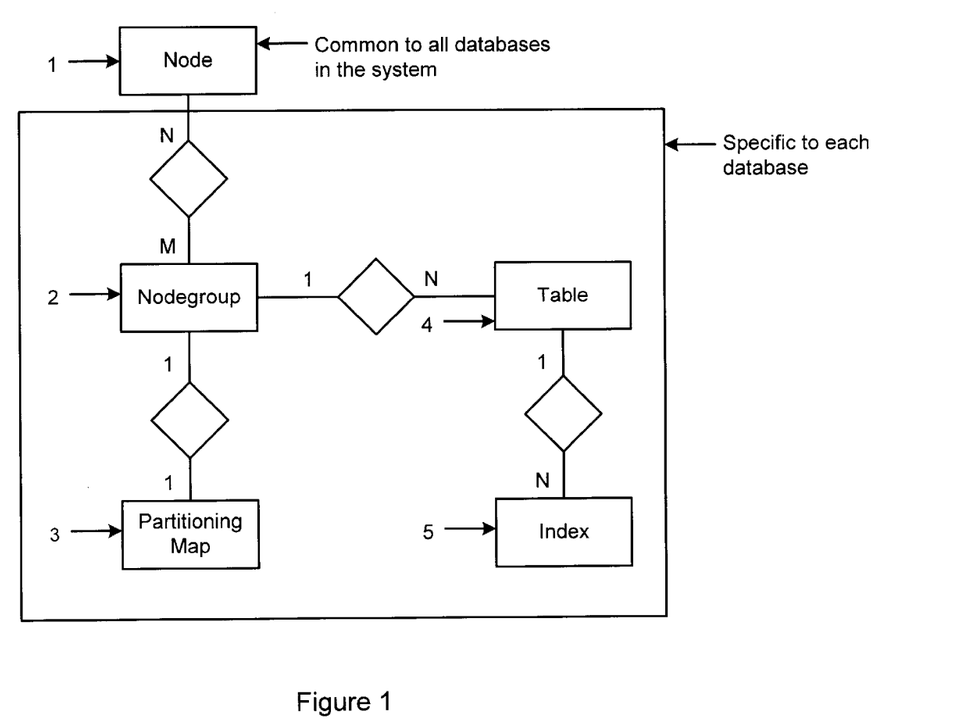
FIG. 1 is a data relationship diagram illustrating the data stored in catalogues (sets of tables describing data in the database) of the database to implement partial declustering of tables in the database system.

FIG. 1 indicates the basic data structures used to implement partial declustering. The figure is basically an entity relationship diagram showing the relationship between various entities (i.e. the items within the boxes). All the entities are specific to each database, except the entities called "nodes". Databases implemented in the parallel database system have access to the nodes of the parallel database system. The entities that are specific to a database are tables, indexes and two new entities implemented in the present invention, namely "nodegroups" and "partitioning maps".

Nodes

Figure 6:
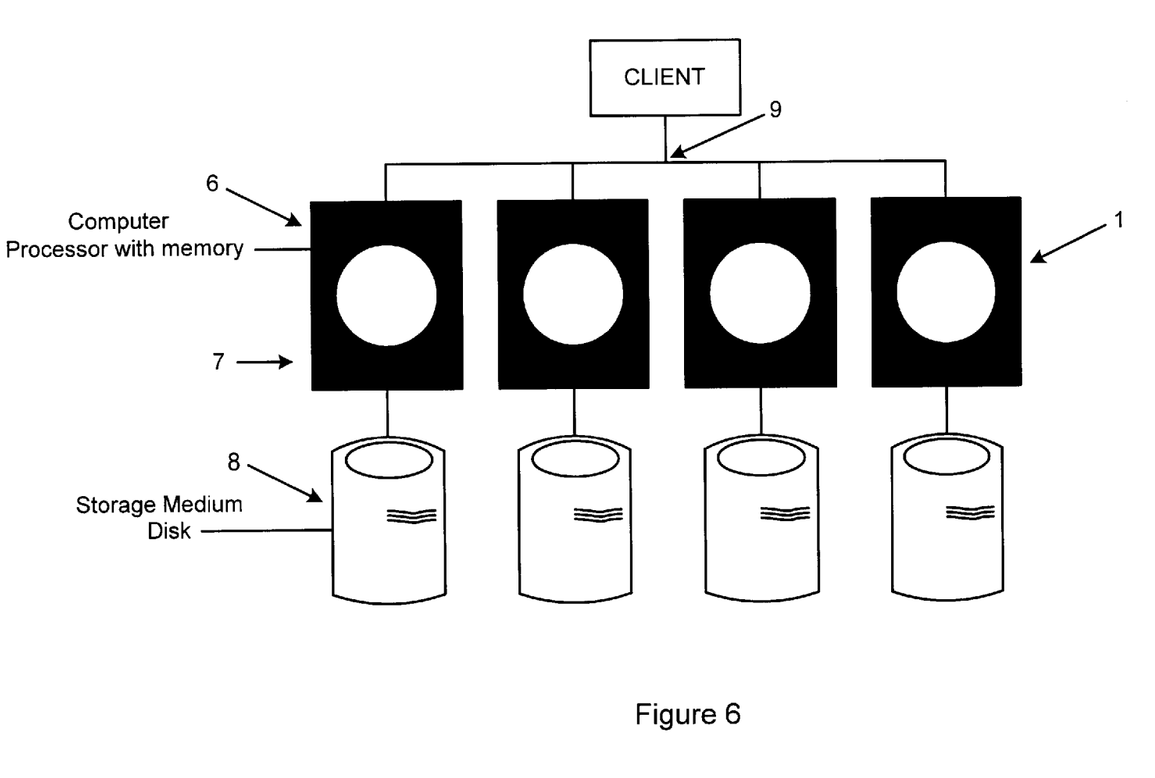
FIG. 6 is an illustration of a parallel database system.

In referring to FIG. 6, in parallel database systems, nodes 1, represent a collection of computational resources including usually a processor 6 for processing, main memory 7, disk storage 8, and communication resources 9. The physical processor 6, which has its own main memory 7, and disks 8, and which can communicate with other processors, represents a node. It is also possible to implement multiple nodes in a single physical processor as long as each node manages its own memory disks and communications. In this case, such nodes will typically multiplex the use of a single physical processor or CPU. In the specific implementation herein, the shared-nothing parallel database system uses a known set of nodes across which data from all databases can be stored. Each node is uniquely identified by a node identifier in the embodiment herein. The set of nodes is common to all databases in the system, that is to say, all databases in the system conceptually have the ability to operate on each of the nodes, however, whether they will or not depends on the specific implementation chosen by the database user applying the method of the invention herein.

Nodegroups

Referring to FIG. 1, the database object called NODE-GROUP 2, is a named subset of the set of nodes in a shared-nothing parallel database system described herein. Each nodegroup in a given database is identified by a unique name. As indicated in FIG. 1, the implementation of the invention herein supports a many-to-many (M-N) relationship between nodes and nodegroups. A nodegroup 2, may contain one or more nodes and each node can be a member of zero or more nodegroups. A nodegroup must contain at least one node. FIG. 5 illustrates another nodegroup formed from nodes N1, N2, N3, N4.

Partitioning Maps

Referring again to FIG. 1, a partitioning map 3 is a data structure associated with a nodegroup 2, which indicates the node on which a given row of a given table is stored. Each partitioning map has a unique partitioning map identification (PMID). As indicated in FIG. 1, each nodegroup 2 is associated with one partitioning map 3 and each partitioning map 3 belongs only to one nodegroup.

A partitioning map can be generated by allocating node numbers to the partitions using a round robin allocation scheme to assign node numbers in the partitioning map. For example, in a 20 node system if there are three nodes in a nodegroup eg. nodes 7, 11, 15 and assuming the partition map contains 4K entries then the partitioning map would be generated as 7, 11, 15, 7, 11, 15 . . . which would repeat to fill the entire 4K space. This of course, assumes a uniform distribution of data, allocating an equal number of partitions for each node. Rows of the database are mapped to the nodes in the nodegroup using the partitioning map.

The SQL DDL statement to form the nodegroup named MYNODEGROUP would be CREATE NODEGROUP MYNODEGROUP ON NODES (7, 11, 15).

Tables

Still referring to FIG. 1, a database consists of a set of tables 4. A table 4 in the database is uniquely identified by the creator name and table name, in a typical implementation. Each table is created within a nodegroup. A nodegroup can contain zero or more (N) tables.

Indexes

A table 4 may have zero or more indexes 5 associated with it. Each index is uniquely identified by the name of the creator and the name of index in this implementation. Other identification methods are useful as well. Each index 5 is associated with a single table 4. Typically the index 5 consists of a fast access structure to access data within the table. This is well known in the art.

Physical Data Structures

The information about the above data structures, nodegroups, partitioning maps, tables and indexes, are stored in the form of catalogue tables, some of which are illustrated in FIG. 2 as follows:

SYSNODEGROUP 10: contains information about nodegroups in the whole processing system eg. the Name of the nodegroup, Definer (the name of the person who defined the nodegroup), Partitioning Map ID for nodegroup.

SYSNODEGROUPDEF 11: contains information about the relationship between nodes and nodegroups, i.e. which subset of nodes are in a given nodegroup.

SYSPARTITIONMAP 12: contains information about partitioning maps.

SYSTABLE 13: contains information about tables, eg. the name of the table, the name of the creator of the table, the name of the nodegroup the table was created in, the partitioning maps ID of the nodegroup.

SYSINDEXES 14: contains information about indexes.

Procedures for Updating Data Structures

Figure 3A:
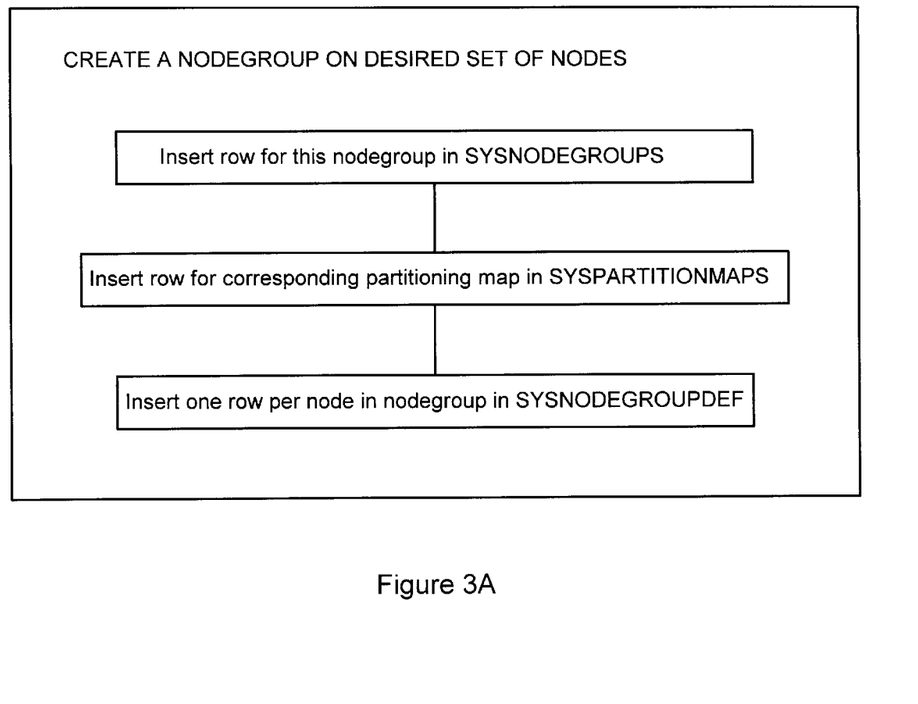
FIGS. 3(a) and 3(b) are an illustration of a series of steps performed when a user creates a partially declustered table in accordance with the invention.
Figure 3B:
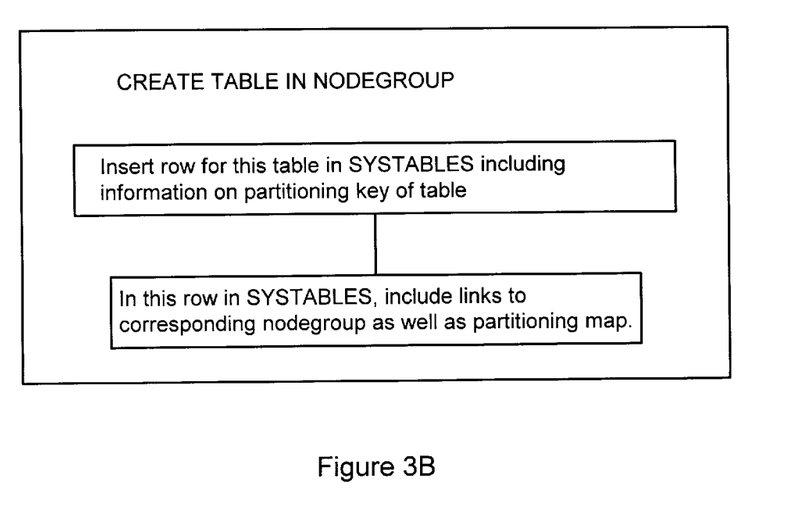

Referring to FIGS. 3(a) and 3(b), the following steps are followed in creating a partially declustered table:

1. Referring to FIG. 3(a), the following method is used to create a nodegroup on the desired set of nodes.

(a) Insert a row of data for the nodegroup into SYSNODEGROUPS.

(b) Insert a row of data for the corresponding partitioning map into SYSPARTITIONMAPS.

(c) Insert one row of data for each node in the nodegroup into SYSNODEGROUPDEF.

2. Referring to FIG. 3(b), the following method is used to create a table in the specified node group:

(a) Insert a row in SYSTABLES for this table.

(b) In the row corresponding to this table in SYSTABLES, include information, eg. nodegroup name, that links this table to the specified nodegroup.

(c) In the row corresponding, store the partitioning key information for the table in SYSTABLES. The partitioning key information is used to decluster the table across the nodes in the nodegroup, as specified in the next section.

Inserting Rows into the Table

Figure 4:
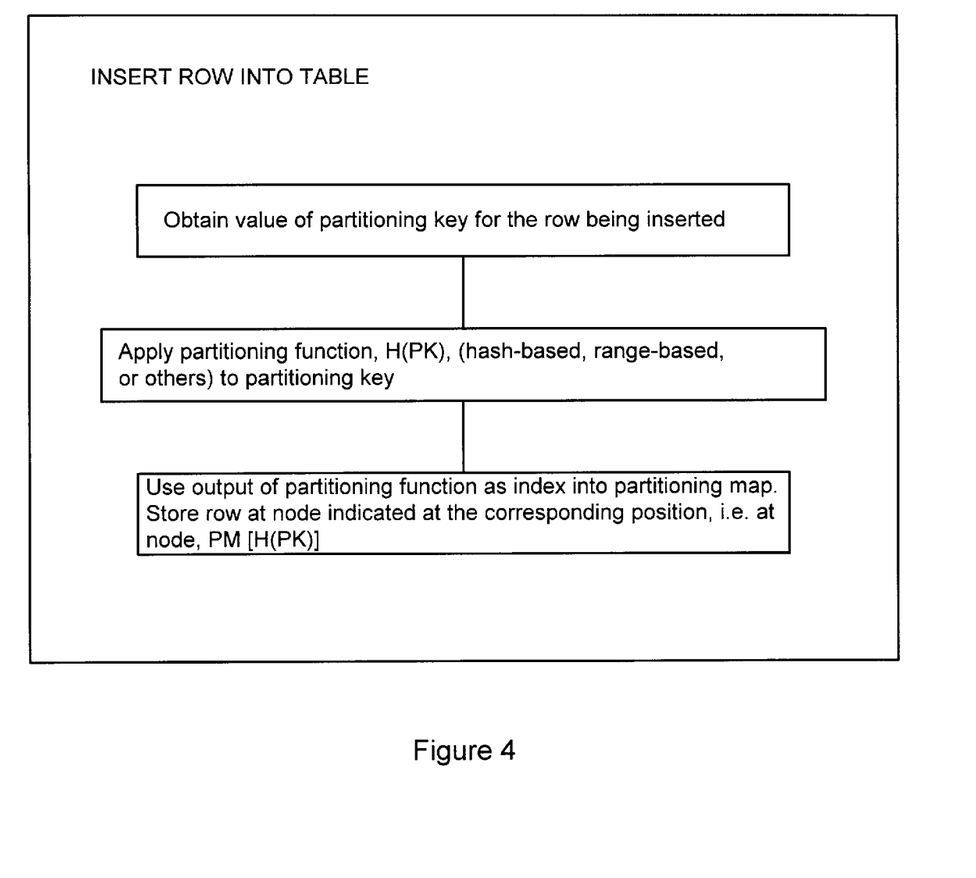
FIG. 4 is an illustration of the process by which a user inserts data into a partially declustered table already resident on the parallel database system.

Referring to FIGS. 4 and 5, for each row to be inserted, use the partitioning key value (either directly or after hashing) as an index to the partitioning map data structure of the node group corresponding to this table. The partitioning map indicates the node in which this row is stored.

Referring to FIG. 5, the distribution of data of a table across a subset of nodes (nodes 1, 2, 3, 4) in a parallel system is illustrated.

In this illustration, A is a column of table 4 and is used as a partitioning key.

H(A), (15) is a hash function used to obtain a partition number when applied to the partitioning key value.

Partitioning map 3 is an array in which each entry contains the node number of the node in which rows of data that hash to this partition (node) are stored.

In this illustration, column B is not used in hashing, the partitioning of data from column B follows that of column A.

From a review of FIG. 5 the distribution of data Ai and Bi (i=1 to 6) from table 4 nodes N1, N2, N3 and N4 respectively, is accomplished using partitioning map 3 as may be readily appreciated.

A further detailed example of the preferred embodiment of the invention using DDL statements is provided below, in which the aspects of partial declustering, overlapped assignment of database tables into multiple nodegroups, and hash partitioning are illustrated in a parallel database in which several nodegroups are implemented. The following nodegroup DDL statement creates three node groups:

CREATE NODEGROUP GROUP_1 ON NODES (1 TO 32, 40, 45, 48)

CREATE NODEGROUP GROUP_2 ON NODES (1, 3, 33)

CREATE NODEGROUP GROUP_3 ON NODES (1 TO 32, 40, 45, 48)

In the above example, GROUP_1 and GROUP_3 are two different nodegroups, even though they contain the same set of nodes, (nodes 1 to 32, 40, 45, and 48). Nodegroup GROUP_2 is partially overlapped with GROUP_1 and GROUP_3 (on nodes 1 and 3).

Extensions to CREATE TABLE DDL

When creating a table, it is advantageous to specify the nodegroup on which the table will be declustered. In addition, it is also advantageous to specify the columns to be used for the partitioning key.

The following example illustrates the use of DDL extensions to the CREATE TABLE statement:

CREATE TABLE PARTS (Partkey integer, Partno Integer) IN GROUP_1 PARTITIONING KEY (partkey) USING HASHING CREATE TABLE PARTSUPP (Partkey Integer, Suppkey Integer, PS_Descp char[50]) IN GROUP_1 PARTITIONING KEY (Partkey) USING HASHING CREATE TABLE CUSTOMERS (Custkey Integer, C_Nation char[20]) IN GROUP_1 PARTITIONING KEY (Custkey) USING HASHING CREATE TABLE SUPPLIERS (Suppkey Integer, S_Nation char [20]) IN GROUP_1 PARTITIONING KEY (Suppkey) USING HASHING CREATE TABLE ORDERS (Orderkey Integer, Custkey Integer, Orderdate date) IN GROUP_1 PARTITIONING KEY (Orderkey) USING HASHING The partitioning key of tables PARTS and PARTSUPP is Partkey. All tables are partitioned across the set of nodes identified by the nodegroup, GROUP_1.

Choosing the Number of Nodes in a Nodegroup

When a set of tables is to be created in a nodegroup, the size of the nodegroup should typically be determined by the size of the tables in this set. The nodegroup should contain a minimum number of nodes such that there is sufficient amount of disk storage available to store the data belonging to all the tables. At the same time, the nodegroup should not contain so many nodes that some nodes end up without any data being stored on them. This would be wasteful of system resources.

Another consideration is the nature of database operations being performed on the tables. In theory, if a database operation is "perfectly scalable", then the time taken to perform this operation on a given table (or set of tables) decreases linearly as the number of nodes in the nodegroup increase (this is because each node has less data to process, as the number of nodes increase). However, in practice, due to data transfer, communications, and other synchronization overheads, most operations are not perfectly scalable. As a result, there may be an "optimal" number of nodes beyond which increasing the number of nodes may result in no change in performance or even a decrease in performance. The point at which this can happen must be determined on a case by case basis, based on the hardware capabilities of each node, the nature of the database operation, and the amount of data involved.

The database query optimizer present in most database systems can be used to assist in this determination as will be appreciated by those skilled in the art.

The absolute maximum for the number of nodes in a nodegroup is, of course, determined by the total number of nodes in the system.

Nodegroup example:

Suppose we have a database consisting of 3 tables:

| | | |
|---|---|---|
| Table A | 500,000 rows | 50 GBytes |
| Table B | 50,000 rows | 10 GBytes |
| Table C | 100 rows | 10 Kbytes |

Suppose we have a system with 64 nodes and a little over 10 Gbytes of database disk storage per node.

A minimum of (50+10+0.00001) GBytes / (10 Gbytes/node)=6 nodes is needed to store all the data.

Suppose that the typical database operations being performed on these tables are searching of tables A and B and joining of tables A, B, and C. Since the search and join operations in this case are scalable operations, we can increase the number of nodes beyond 6 and obtain a performance improvement for the operations performed on Tables A and B. However, Table C is very small in size and 6 nodes is already too many for that table (assuming a disk page size of 4 Kbytes, the entire Table C can fit on 2.5 pages for which a single node is sufficient). Also, suppose that the optimal number of nodes for performing searching and joins of tables A and B is less than 64, say 40. Then these tables should be created in a nodegroup containing 40 out of the 64 nodes.

Thus, for the above database example, we would create two nodegroups, one with 40 nodes and another with 1 node (could be one of the 40 or not). Tables A and B would be created in the 40-node nodegroup and Table C would be created in the 1-node nodegroup.

As will be well recognized by those skilled in the art to which this invention pertains, the invention may be practised in computer systems and in computer programs for the operation of computer systems.

What is claimed is:

1. For a statically partitioned parallel database system comprising a plurality of interlinked database nodes, each of the nodes having associated storage and processor resources, a method of distributing data of a table across the nodes, comprising:

selecting a subset of nodes to be associated with each other, wherein the nodes to be associated with each other are selected based on a nature of operations to be performed on the table;

associating the subset of nodes with each other;

associating the table with the subset of nodes;

partitioning the table across the subset of nodes in accordance with a predetermined partitioning arrangement; and distributing data of the table across the subset of nodes in accordance with the partitioning arrangement.

2. The method of claim 1 wherein the partitioning is selected from the group of at least one of a horizontal partitioning, vertical partitioning, or a partitioning map defining the relationship of partitions of the table to the subset of nodes.

3. The method of claim 2 in which data is distributed to the subset of nodes as applied to a partitioning key value, and information contained in a partitioning map, wherein:

a partitioning key is a set of user defined fields for the table; and a partitioning key value is the value of a selected set of the fields for a particular row of the table, in the case of horizontal partitioning; or, for a particular column of the table, in the case of vertical partitioning.

4. The method of claim 3 wherein the partitioning method is applied to the key value to obtain an index value to the partitioning map which defines the location in the partitioning map which provides the node number where the particular row is to be stored, in the case of horizontal partitioning; or, where the particular column is to be stored, in the case of vertical partitioning.

5. The method of claim 4 wherein the partitioning method comprises a partitioning method selected from hash partitioning, range partitioning or round robin partitioning.

6. The method of claim 2 wherein the nodes selected for the subset are selected based on one or more of the following factors:

the size of the table;

the capacity of storage at each node;

the maximum number of horizontal or vertical partitions, respectively;

and the nature of operations to be performed on the table.

7. The method of claim 1 wherein each of the nodes in the subset of nodes is associated with its own storage resources and at least one processor.

8. The method of claim 1 as applied to a plurality of tables comprising:

selecting subsets of nodes to be associated with each other, wherein the nodes to be associated with each other are selected based on a nature of operations to be performed on the tables;

associating the subsets of nodes with each other;

associating each of the tables with the subsets of nodes;

partitioning the tables across the subsets of nodes in accordance with predetermined partitioning arrangements; and distributing data of the tables across subsets of nodes in accordance with the partitioning arrangements.

9. The method of claim 8 wherein each table is partitioned in accordance with an unique partitioning arrangement.

10. The method of claim 8 wherein the subsets of nodes are selectively nonoverlapping or overlapping.

11. A statically partitioned parallel database system comprising a plurality of interlinked database nodes, each of the nodes having associated storage and processor resources, comprising:

data distribution means for distributing data of a table across the nodes, comprising:

selecting a subset of nodes to be associated with each other, wherein the nodes to be associated with each other are selected based on a nature of operations to be performed on the table;

associating the subset of nodes with each other;

associating the table with the subset of nodes;

partitioning means for partitioning the table across the subset of nodes in accordance with a predetermined partitioning arrangement; and, distributing means for distributing data of the table across the subset of nodes in accordance with the partitioning arrangement.

12. The apparatus of claim 11 wherein the partitioning is selected from the group of at least one of a horizontal partitioning, vertical partitioning, or a partitioning map defining the relationship of partitions of the table to the subset of nodes.

13. The apparatus of claim 11 comprising means for distributing data to the subset of nodes using the means for partitioning applied to a partitioning key value, and information contained in the partitioning map, wherein:

a partitioning key is a set of user defined fields for the table; and, a partitioning key value is the value of a selected set of the fields for a particular row of the table, in the case of horizontal partitioning or, for a particular column of the table, in the case of vertical partitioning.

14. The apparatus of claim 13 wherein the means for partitioning is operated on the key value to obtain an index value to the partitioning map which defines the location in the partitioning map which provides the node number where the particular row is to be stored in the case of horizontal partitioning; or, where the particular column is to be stored in the case of vertical partitioning.

15. The apparatus of claim 14 wherein the means for partitioning comprises partitioning means selected from hash partitioning means, range partitioning means or round robin partitioning means.

16. The apparatus of claim 12 wherein the nodes selected for the subset are selected based on one or more of the following factors:

the size of the table;

the capacity of storage at each node;

the maximum number of horizontal or vertical partitions respectively;

and the nature of operations to be performed on the table.

17. The apparatus of claim 11 in which each of the nodes in the subset of nodes is associated with its own storage resources and at least one processor.

18. The apparatus of claim 11 applied to a plurality of tables comprising:

means for selecting subsets of nodes to be associated with each other, wherein the nodes to be associated with each other are selected based on a nature of operations to be performed on the tables;

means for associating the subsets of nodes with each other;

means for associating each of the tables with the subsets of nodes;

means for partitioning the tables across the subsets of nodes in accordance with predetermined partitioning arrangements; and means for distributing data of the tables across the subsets of nodes in accordance with the partitioning arrangements.

19. The apparatus of claim 18 in which each partitioning arrangement is unique.

20. The apparatus of claim 18 in which the subsets of nodes are selectively nonoverlapping or overlapping.

21. The apparatus of claim 11 comprising a computer program product having a recording medium embodying the apparatus in the medium for operation in conjunction with a parallel data processing system to distribute data of a table across the subset of nodes of the processing system to facilitate processing of the table data by the data processing system.

22. An article of manufacture comprising:

a computer usable medium having computer readable program code embodied therein for causing a computer system to distribute data of a table across a subset of nodes of a parallel database system;

the computer readable program code in the article of manufacture comprising:

computer readable program code for causing a computer to select a subset of nodes to be associated with each other, wherein the nodes to be associated with each other are selected based on a nature of operations to be performed on the table; associate the subset of nodes with each other; associate the table with the subset of nodes; partition the table in accordance with a predetermined partitioning arrangement; and distribute data of the table across the subset of nodes in accordance with the partitioning arrangement.

23. The article of manufacture of claim 22 wherein the partitioning comprises computer readable program code for causing a computer to select from the group of at least one of a horizontal partitioning, vertical partitioning of the table, or a partitioning map defining the relationship of partitions of the table to the subset of nodes.

24. The article of manufacture of claim 23 comprising computer readable program code for causing a computer to distribute data to the subset of nodes using the code applied to a partitioning key value, and information contained in the partitioning map, wherein:

a partitioning key is a set of user defined fields for the table; and, a partitioning key value is the value of a selected set of the fields for a particular row of the table, in the case of horizontal partitioning or, for a particular column of the table, in the case of vertical partitioning.

25. The article of manufacture of claim 24 comprising computer readable program code for causing a computer to utilize the partitioning code with the key value to obtain an index value to the partitioning map which defines the location in the partitioning map which provides the node number where the particular row is to be stored, in the case of horizontal partitioning; or, where the particular column is to be stored in the case of vertical partitioning.

26. The article of manufacture of claim 25 wherein the partitioning code comprises partitioning selected from hash partitioning, range partitioning or round robin partitioning.

27. The article of manufacture of claim 23 wherein the nodes selected for the subset are selected based on one or more of the following factors:

the size of the table;

the capacity of storage at each node;

the maximum number of horizontal or vertical partitions respectively;

and the nature of operations to be performed on the table.

28. The article of manufacture of claim 22 in which each of the nodes in the subset of nodes is associated with its own storage resources and at least one processor.

29. The article of manufacture of claim 22, for use with a plurality of tables, comprising:

computer readable program code for causing a computer to partition the tables in accordance with predetermined partitioning arrangements; and computer readable program code for causing a computer to distribute data of the tables across subsets of the nodes in accordance with the partitioning arrangements.

30. The article of manufacture of claim 29 in which each partitioning arrangement is unique.

31. The article of manufacture of claim 29 in which the subsets of nodes are relatively nonoverlapping or overlapping.

32. A program storage device readable by a computer system, tangibly embodying a program of instructions executable by the system to perform the method steps for distributing data of a table across a subset of nodes of a statically partitioned parallel database system comprising a plurality of interlinked database nodes, the method steps comprising:

selecting a subset of nodes to be associated with each other, wherein the nodes to be associated with each other are selected based on a nature of operations to be performed on the table;

associating the subset of nodes with each other;

associating the table with the subset of nodes;

partitioning the table in accordance with a predetermined partitioning arrangement; and distributing data of the table across the subset of nodes in accordance with the partitioning arrangement.

33. A memory for storing data for access by a program being executed on a data processing system, comprising:

a data structure stored in the memory, the data structure including information resident in a data base used by the program and including:

a plurality of data objects stored in the memory, each of the data objects containing different information from the data base;

a data object for selecting a subset of nodes to be associated with each other, wherein the nodes to be associated with each other are selected based on a nature of operations to be performed on the table;

a data object for associating the subset of nodes with each other;

a data object for associating the table with the subset of nodes;

a data object for partitioning the table in accordance with a predetermined partitioning arrangement; and a data object for distributing data of the table across the subset of the nodes in accordance with the partitioning arrangement.

* * * * *

UNITED STATES PATENT AND TRADEMARK OFFICE
CERTIFICATE OF CORRECTION

PATENT NO.     : 5,878,409
DATED          : March 2, 1999
INVENTOR(S)    : Chaitanya Baru, Gilles Fecteau, Jo-Anne Kirton, Lubor J. Kollar and Fred Koo It is certified that error appears in the above-identified patent and that said Letters Patent is hereby corrected as shown below:

Column 11, Line 43, after the word "partitioning" second occurrence, delete "of the table,"

Signed and Sealed this

Fourteenth Day of March, 2000

Attest:

Q. TODD DICKINSON

Attesting Officer

Commissioner of Patents and Trademarks